United States Patent
Lu et al.

(10) Patent No.: US 11,561,820 B2
(45) Date of Patent: Jan. 24, 2023

(54) TASK OPTIMIZATION METHOD AND TASK OPTIMIZATION DEVICE IN MOBILE ROBOT

(71) Applicant: SHANGHAI SLAMTEC CO., LTD., Shanghai (CN)

(72) Inventors: Yi Lu, Shanghai (CN); Jing Bai, Shanghai (CN); Yuxiang Li, Shanghai (CN)

(73) Assignee: SHANGHAI SLAMTEC CO., LTD., Shanghai (CN)

( * ) Notice: Subject to any disclaimer, the term of this patent is extended or adjusted under 35 U.S.C. 154(b) by 380 days.

(21) Appl. No.: 16/646,165

(22) PCT Filed: Sep. 5, 2018

(86) PCT No.: PCT/CN2018/104230
§ 371 (c)(1),
(2) Date: Mar. 11, 2020

(87) PCT Pub. No.: WO2019/052389
PCT Pub. Date: Mar. 21, 2019

(65) Prior Publication Data
US 2020/0272508 A1 Aug. 27, 2020

(30) Foreign Application Priority Data
Sep. 13, 2017 (CN) .......................... 201710823805.X

(51) Int. Cl.
*G06F 9/48* (2006.01)
*G06F 16/9035* (2019.01)
(Continued)

(52) U.S. Cl.
CPC .......... *G06F 9/4843* (2013.01); *G06F 9/3836* (2013.01); *G06F 16/9035* (2019.01); *G06N 20/00* (2019.01)

(58) Field of Classification Search
None
See application file for complete search history.

(56) References Cited

U.S. PATENT DOCUMENTS 9,460,401 B2 10/2016 Zeng et al.
2013/0289767 A1 10/2013 Lim et al.
(Continued)

FOREIGN PATENT DOCUMENTS

CN 1338980 A 3/2002
CN 103064743 A 4/2013
(Continued)

*Primary Examiner* — Insun Kang
(74) *Attorney, Agent, or Firm* — Bayramoglu Law Offices LLC

(57) ABSTRACT

A task optimization method and a task optimization device in a mobile robot are provided. The task optimization method includes: obtaining at least one task type in a mobile robot and usage information when all users use a task corresponding to each task type; separately performing machine learning on the usage information of all the users corresponding to each task type to obtain at least one piece of user's usage habit information corresponding to each task type and usage probability thereof, thereby performing machine learning on usage information when all users use the task corresponding to the task type; based on the at least one piece of usage habit information corresponding to each task type, the usage probability thereof and the real-time usage information, optimizing the task corresponding to the task type used by the user in real time.

19 Claims, 3 Drawing Sheets

(51) Int. Cl.
  *G06N 20/00*  (2019.01)
  *G06F 9/38*  (2018.01)

(56)  References Cited

U.S. PATENT DOCUMENTS

2015/0286487 A1* 10/2015 Glass ..................... G06F 9/453
                                                           715/707
2017/0344895 A1* 11/2017 Roy ....................... G06N 20/00
2019/0370032 A1* 12/2019 Arar ..................... H04L 67/535

FOREIGN PATENT DOCUMENTS

| CN | 103149898 A | 6/2013 |
| CN | 104461711 A | 3/2015 |
| CN | 104486416 A | 4/2015 |
| CN | 105094093 A | 11/2015 |
| CN | 106055399 A | 10/2016 |
| CN | 106096576 A | 11/2016 |
| CN | 106980320 A | 7/2017 |
| CN | 107544248 A | 1/2018 |

* cited by examiner

TASK OPTIMIZATION METHOD AND TASK OPTIMIZATION DEVICE IN MOBILE ROBOT

CROSS REFERENCE TO THE RELATED APPLICATIONS

This application is the national phase entry of International Application No. PCT/CN2018/104230, filed on Sep. 5, 2018, which is based upon and claims priority to Chinese Patent Application No. 201710823805.X, filed on Sep. 13, 2017, the entire contents of which are incorporated herein by reference.

TECHNICAL FIELD

The present invention relates to the field of computer technology, in particular to a task optimization method and a task optimization device in a mobile robot.

BACKGROUND

With the continuous progress of science and technology, mobile-robot-related technology has become more and more mature, and the application scenarios thereof have become more and more prevalent improving the convenience of modern day life. When a mobile robot performs each task function, however, the mobile robot is challenged by a variety of user habits. It is, therefore, imperative to improve the running efficiency of the mobile robot so that tasks may be executed more intelligently. At present, the content of the task function setting of a mobile robot is typically provided by developers, and users have to choose the set task function the developers provided that meets their current needs. Such developer provisioning of the task function cannot provide an optimal user-friendly experience. The mismatch between mobile robot function and user preferences very often wastes user time and resources.

Therefore, the robotics industry's research and focus are now concentrated on how to make the mobile robot complete a task more efficiently and intelligently. It is also desirable to improve the economy of the user's time when employing a mobile robot to perform a task.

SUMMARY

An objective of the present invention is to provide a task optimization method and a task optimization device in a mobile robot so that the mobile robot can intelligently and efficiently complete execution of the task required by a user. The device and method should be able to simultaneously reduce the time and resources spent by the user on using the mobile robot to perform the task.

According to one aspect of the present invention, a task optimization method in a mobile robot is provided, including the following steps:

S11: obtaining at least one task type in the mobile robot and usage information when all users use a task corresponding to each task type;

S12: separately performing machine learning on the usage information of all the users corresponding to each task type to obtain at least one piece of user's usage habit information corresponding to each task type and usage probability thereof;

S13: obtaining real-time usage information when the user uses the task corresponding to the task type in the mobile robot in real time; and S14: based on the at least one piece of usage habit information corresponding to each task type, the usage probability thereof and the real-time usage information, optimizing the task corresponding to the task type used by the user in real time.

Further, in the above method, the step S14 of "based on the at least one piece of usage habit information corresponding to each task type, the usage probability thereof and the real-time usage information, optimizing the task corresponding to the task type used by the user in real time", includes:

S141: based on the at least one piece of usage habit information corresponding to each task type and usage probability thereof, analyzing and matching the real-time usage information to obtain user's usage habit information matched with the real-time usage information; and S142: based on the user's usage habit information matched with the real-time usage information, optimizing the task corresponding to the task type used by the user in real time.

Further, in the above method, the step S141 of "based on the at least one piece of usage habit information corresponding to each task type and usage probability thereof, analyzing and matching the real-time usage information to obtain user's usage habit information matched with the real-time usage information", includes:

based on the task type used by the user in real time, obtaining at least one piece
of usage habit information corresponding to the task type and the usage probability thereof
used by the user in real time from the at least one piece of usage habit information corresponding to each task type and usage probability thereof;

separately calculating a similarity between the real-time usage information and each usage habit information corresponding to the task type used by the user in real time; and based on the similarity and the usage probability, obtaining the user's usage habit information matched with the real-time usage information.

Further, in the above method, the step S12 of "separately performing machine learning on the usage information of all the users corresponding to each task type to obtain at least one piece of user's usage habit information corresponding to each task type and usage probability thereof", includes:

based on a preset machine learning model, separately performing machine learning on the usage information of all the users corresponding to each task type to obtain the at least one piece of user's usage habit information corresponding to each task type and the usage probability thereof.

Further, in the above method, after the step S14 of "based on the at least one piece of usage habit information corresponding to each task type, the usage probability thereof and the real-time usage information, optimizing the task corresponding to the task type used by the user in real time", the method further includes:

informing the user of the optimized task corresponding to the task type used by the user in real time by a message reminder.

Further, in the above method, the method further includes:

based on the usage status information obtained when the user uses the task corresponding to the task type in the mobile robot in real time, updating the usage probability of the user's usage habit information corresponding to the task type.

Further, in the above method, the usage habit information includes one or more items of usage time, usage place, usage scope and usage counter.

According to another aspect of the invention, a task optimization device in a mobile robot is provided, including the following:

a first acquisition device configured to obtain at least one task type in the mobile robot and usage information when all users use a task corresponding to each task type;

a learning device configured to separately perform machine learning on the usage information of all the users corresponding to each task type to obtain at least one piece of user's usage habit information corresponding to each task type and usage probability thereof;

a second acquisition device configured to obtain real-time usage information when the user uses the task corresponding to the task type in the mobile robot in real time; and an optimization device configured to optimize the task corresponding to the task type used by the user in real time based on the at least one piece of usage habit information corresponding to each task type, the usage probability thereof and the real-time usage information.

Further, in the above devices, the optimization device is configured to:

based on the at least one piece of usage habit information corresponding to each task type and usage probability thereof, analyze and match the real-time usage information to obtain user's usage habit information matched with the real-time usage information; and based on the user's usage habit information matched with the real-time usage information, optimize the task corresponding to the task type used by the user in real time.

Further, in the above devices, the optimization device is configured to:

based on the task type used by the user in real time, obtain at least one piece of usage habit information corresponding to the task type used by the user in real time and the usage probability thereof from the at least one piece of usage habit information corresponding to each task type and usage probability thereof;

separately calculate a similarity between the real-time usage information and each usage habit information corresponding to the task type used by the user in real time; and based on the similarity and the usage probability, obtain the user's usage habit information matched with the real-time usage information.

Further, in the above devices, the learning device is configured to:

based on a preset machine learning model, separately perform machine learning on the usage information of all the users corresponding to each task type to obtain the at least one piece of user's usage habit information corresponding to each task type and the usage probability thereof.

Further, in the above devices, the optimization device is configured to:

inform the user of the optimized task corresponding to the task type used by the user in real time by a message reminder.

Further, in the above devices, an update device is further provided, wherein, the update device is configured to:

based on the obtained usage status information when the user uses the task corresponding to the task type in the mobile robot in real time, update the usage probability of the user's usage habit information corresponding to the task type.

Further, in the above devices, the usage habit information includes one or more items of usage time, usage place, usage scope and usage counter.

Further, according to yet another aspect of the present invention, a computing device is provided, including:

a processor;

a memory configured to store a computer executable instruction, wherein, the computer executable instruction enables the processor to execute the following steps:

S11: obtaining at least one task type in a mobile robot and usage information when all users use a task corresponding to each task type;

S12: separately performing machine learning on the usage information of all the users corresponding to each task type to obtain at least one piece of user's usage habit information corresponding to each task type and usage probability thereof;

S13: obtaining real-time usage information when the user uses the task corresponding to the task type in the mobile robot in real time; and S14: based on the at least one piece of usage habit information corresponding to each task type, the usage probability thereof and the real-time usage information, optimizing the task corresponding to the task type used by the user in real time.

According to the fourth aspect of the present invention, a computer readable storage medium is provided, wherein, the computer readable storage medium stores a computer executable instruction, and the computer executable instruction enables the processor to execute the following steps:

S11: obtaining at least one task type in a mobile robot and usage information when all users use a task corresponding to each task type;

S12: separately performing machine learning on the usage information of all the users corresponding to each task type to obtain at least one piece of user's usage habit information corresponding to each task type and usage probability thereof;

S13: obtaining real-time usage information when the user uses the task corresponding to the task type in the mobile robot in real time; and S14: based on the at least one piece of usage habit information corresponding to each task type, the usage probability thereof and the real-time usage information, optimizing the task corresponding to the task type used by the user in real time.

Compared with the prior art, in the method in the present invention, at least one task type in a mobile robot and usage information when all users use a task corresponding to each task type is obtained; machine learning is separately performed on the usage information of all the users corresponding to each task type to obtain at least one piece of user's usage habit information corresponding to each task type and usage probability thereof. For each task type in the mobile robot, the machine learning is performed on usage information when all users use the task corresponding to the task type, and at least one piece of user's usage habit information corresponding to each task type and the usage probability thereof are automatically generated which facilitates subsequently obtaining real-time usage information when the user uses the task corresponding to the task type in the mobile robot in real time. based on the at least one piece of usage habit information corresponding to each task type, the usage probability thereof and the real-time usage information, the task corresponding to the task type used by the user in real time is optimized. In this way, the mobile robot with the aid of the method can more efficiently and intelligently complete execution of the task corresponding to the corresponding task type, and the time and resources spent by the user on using the task corresponding to the task type in the mobile robot in real time can be reduced.

BRIEF DESCRIPTION OF THE DRAWINGS

By reading the detailed description of the non-restrictive embodiment with reference to the drawings, the other features, objectives and advantages of the present invention becomes more obvious.

The same or similar reference numerals in the drawings indicate the same or similar parts.

DETAILED DESCRIPTION OF THE EMBODIMENTS

The present invention is further described in detail in conjunction with the drawings.

In a typical configuration in the present invention, each of a terminal, a service network device, and a trusted party includes one or more central processing units (CPU), input/output interfaces, network interfaces and memories.

The memory may include a non-persistent memory, a random access memory (RAM), and/or a non-volatile memory of computer-readable media such as a read-only memory (ROM) or a flash random access memory (flash RAM). The memory is an example of the computer-readable medium.

The computer-readable medium includes persistent media, non-persistent media, movable media, and unmovable media, which can implement information storage by any method or technology. Information may be a computer-readable instruction, a data structure, a program module, or other data. The computer storage media includes, but are not limited to, a phase-change RAM (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, a magnetic disk storage device or other magnetic storage device, or any other non-transmission media capable of storing information that a computing device can access. As defined herein, the computer-readable media does not include non-transitory computer-readable media, such as modulated data signals and carrier waves.

Figure 1:
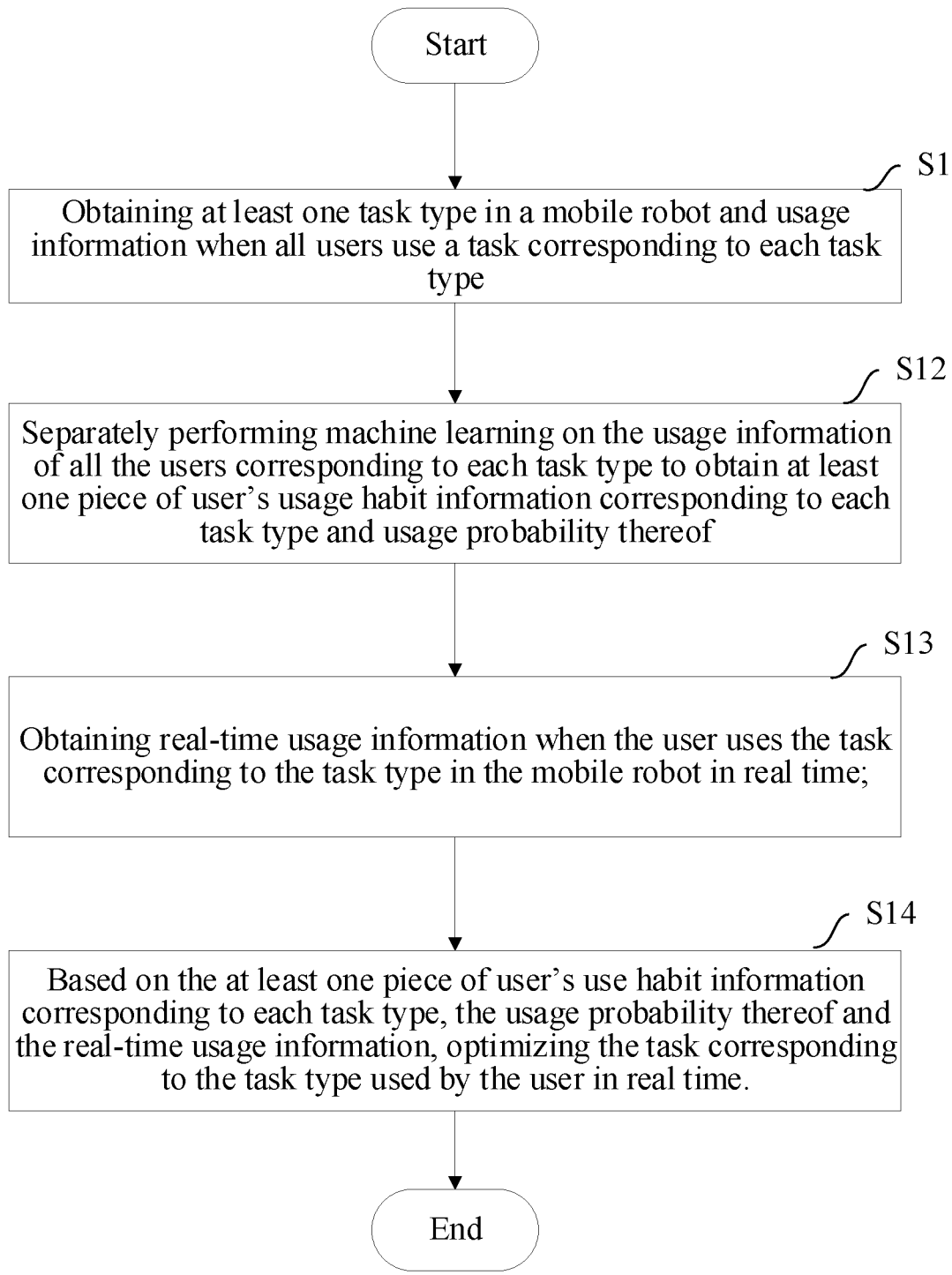
FIG. 1 shows a flow diagram of a task optimization method in a mobile robot according to one aspect of the present invention.

FIG. 1 shows a flow diagram of a task optimization method in a mobile robot according to the first aspect of the present invention, when a user uses a task in a mobile robot in real time, in the process of optimizing the task corresponding to the task type to be performed by the mobile robot, the method includes step S11, step S12, step S13 and step S14, as follows.

In step S11, at least one task type in a mobile robot and usage information when all users use a task corresponding to each task type are obtained.

In step S12: machine learning is separately performed on the usage information of all the users corresponding to each task type to obtain at least one piece of user's usage habit information corresponding to each task type and usage probability thereof. Thereby, for each task type in the mobile robot, the machine learning is performed on usage information when all users use a task corresponding to a task type to automatically generate at least one piece of user's usage habit information corresponding to each task type and usage probability thereof, so that when a user subsequently uses the task corresponding to the task type in the mobile robot in real time, the task is optimized. Subsequently, when a user uses a task corresponding to a task type in the mobile robot in real time, in step S13, real-time usage information when the user uses the task corresponding to the task type in the mobile robot in real time is obtained.

Then, in step S14, based on the at least one piece of usage habit information corresponding to each task type, the usage probability thereof and the real-time usage information, the task corresponding to the task type used by the user in real time is optimized, which can facilitate the mobile robot to complete execution of the task corresponding to the related task type more efficiently and intelligently, and can reduce the time and resources spent by the user on using the task corresponding to the task type in the mobile robot in real time.

Here, the usage information obtained in step S11 when all users use a task corresponding to each task type may include, but is not limited to, one or more items of the usage time, the usage place, the usage scope and the usage counter. Specifically, the usage time may include the usage start time, the usage end time, the usage duration and so on. Of course, those skilled in the art shall understand that any other existing usage information or any other prospective usage information, which is applicable to the present invention, shall fall within the protective scope of the claimed invention and shall be included herein by reference.

Of course, in the present invention, the at least one piece of user's usage habit information corresponding to each task type obtained in S12 by separately performing machine learning on the usage information of all the users corresponding to each task type may include, but is not limited to, one or more items of the usage time, the usage place, the usage scope and the usage counter. Specifically, the usage time may include the usage start time, the usage end time, the usage duration and so on. Of course, those skilled in the art shall understand that any other existing usage habit information or any other prospective usage habit information, which is applicable to the present invention, shall fall within the protective scope of the present invention and shall be included herein by reference.

Further, the step of "machine learning is separately performed on the usage information of all the users corresponding to each task type to obtain at least one piece of user's usage habit information corresponding to each task type and usage probability thereof" in step S12 includes:

based on a preset machine learning model, the machine learning is separately performed on the usage information of all the users corresponding to each task type to obtain at least one piece of user's usage habit information corresponding to each task type and usage probability thereof. Herein, different preset machine learning models are determined according to different application scenarios of the mobile robot, and the different machine learning models correspond to different machine learning algorithms.

In an embodiment of the present invention, at least one task type in a mobile robot in step S11 and usage information when all users use a task corresponding to each task type are shown in Table-1. For different task types, the number of usage information corresponding to each task type is at least one. Among different usage information corresponding to the same task type, a corresponding preset machine learning model can be adopted to learn and obtain at least one piece of usage habit information corresponding to the task type and the usage probability thereof. For example, for task type A, and if the task type A corresponds to six groups of usage habit information and usage probability, including: usage habit information M1 and usage probability p1, usage habit information M2 and usage probability p2, usage habit information M3 and usage probability p3, usage habit information M4 and usage probability p4, usage habit information M5 and usage probability p5, and usage habit information M6 and usage probability p6. In this way, machine learning can be performed on usage information of all users corresponding to each task type in the mobile robot, so as to optimize the task when a user subsequently uses the task corresponding to the task type in the mobile robot in real time.

task type and the usage probability thereof used by the user uses in real time is obtained from at least one piece of usage habit information corresponding to each task type and usage probability thereof. For example, if a user uses a mobile robot in real time to obtain the task type used by the user in real time, such as the task type A, then at least one piece of usage habit information corresponding to the task type and the usage probability thereof A used by the user in real time are obtained from at least one piece of usage habit information corresponding to each task type and usage probability thereof in Table-1. If the task type A corresponds to six groups of usage habit information and usage probability, then they are respectively: usage habit information M1 and usage probability p1, usage habit information M2 and usage probability p2, usage habit information M3 and usage probability p3, usage habit information M4 and usage probability p4, usage habit information M5 and usage probability p5, and usage habit information M6 and usage probability p6.

A similarity between a real-time usage information and each usage habit information corresponding to the task type used by the user in real time is separately calculated. For example, the similarities between the real-time usage information and the usage habit information M1, between the real-time usage information and the usage habit information M2, between the real-time usage information and the usage habit information M3, between the real-time usage information and the usage habit information M4, between the real-time usage information and the usage habit information M5, and between the real-time usage information and the usage habit information M6 are calculated, respectively, so as to correspondingly obtain the similarity 1, the similarity 2, the similarity 3, the similarity 4, the similarity 5 and the similarity 6, respectively. The similarities are arranged in ascending order as follows: similarity 3, similarity 1, similarity 4, similarity 6, similarity 5, and similarity 2.

Based on the similarity and the usage probability, the user's usage habit information matched with the real-time usage information is obtained. For example, if the usage probabilities respectively corresponding to the usage habit information M1, the usage habit information M2, the usage habit information M3, the usage habit information M4, the usage habit information M5, and the usage habit information M6 are arranged in descending order, as follows: usage probability p3, usage probability p4, usage probability p1, usage probability p6, usage probability p2, and usage probability p5. According to the similarity between the real-time usage information and each usage habit information corresponding to the task type used by the user in real time, and the usage probability of each usage habit information, it can

TABLE 1

Usage habit information corresponding to each task type and usage probability thereof in a mobile robot

| | Usage time | Usage place | Usage range | Usage count | ... | Usage habit information | Usage probability |
|---|---|---|---|---|---|---|---|
| Task type A | T1 | PL1 | S1 | U1 | | M1 | p1 |
| Task type A | T2 | PL 2 | S2 | U2 | | M2 | p2 |
| ... | Tm | PL m | Sm | Um | | Mm | pm |
| Task type B | T(m + 1) | PL(m + 1) | S(m + 1) | U(m + 1) | | M(m + 1) | p(m +1) |
| Task type B | T(m + 2) | PL(m + 2) | S(m + 2) | U(m + 2) | | M(m + 2) | p(m + 2) |
| ... | T(m + n) | PL(m + n) | S(m + n) | U(m + n) | | M(m + n) | p(m + n) |

In an embodiment of the present invention, the step of "based on the at least one piece of usage habit information corresponding to each task type, the usage probability thereof and the real-time usage information, the task corresponding to the task type used by the user in real time is optimized" in step S14 includes:

based on at least one piece of usage habit information corresponding to each task type and usage probability thereof, real-time usage information is analyzed and matched to obtain user's usage habit information matched with the real-time usage information; based on the user's usage habit information matched with the real-time usage information, the task corresponding to the task type used by the user in real time is optimized, so as to optimize the task corresponding to the task type when the user uses the mobile robot in real time, which can help the mobile robot to complete execution of the task corresponding to the corresponding task type more efficiently and intelligently, thereby reducing the cost of time and resources when the user uses the task corresponding to the task type in the mobile robot in real time.

Further, the step of "based on at least one piece of usage habit information corresponding to each task type and usage probability thereof, real-time usage information is analyzed and matched to obtain user's usage habit information matched with the real-time usage information" in step S14 includes:

based on a task type used by a user in real time, at least one piece of usage habit information corresponding to the be obtained that the usage habit information matched with the real-time usage information should be the usage habit information M3, thereby realizing the matching of the usage habit information corresponding to the real-time usage information.

In an embodiment of the invention, if the similarities between the real-time usage information and the usage habit information M1, between the real-time usage information and the usage habit information M2, between the real-time usage information and the usage habit information M3, between the real-time usage information and the usage habit information M4, between the real-time usage information and the usage habit information M5, and between the real-time usage information and the usage habit information M6, which are obtained in step S14, are arranged in ascending order as follows: similarity 3 and similarity 1, similarity 4, similarity 6, similarity 5, and similarity 2, wherein, similarity 3 is the same as similarity 1, so similarity 3 and similarity 1 tie for first place. Furthermore, if the usage probabilities respectively corresponding to the usage habit information M1, the usage habit information M2, the usage habit information M3, the usage habit information M4, the usage habit information M5, and the usage habit information M6 are arranged in descending order as follows: usage probability p3, usage probability p4, usage probability p1, usage probability p6, usage probability p2, and usage probability p5, since the similarity between the real-time usage information and the usage habit information M3 is the highest, and the usage probability p3 of the usage habit information M3 is greater than the usage probability p1 of the usage habit information M1, step S14 can figure out that the usage habit information matched with the real-time usage information should be the usage habit information M3, thereby realizing the matching of the usage habit information corresponding to the real-time usage information.

In an embodiment of the invention, when a user uses a task corresponding to a certain task type A among the tasks corresponding to at least one task type in a mobile robot in real time, if the current real-time usage information used by the user, such as usage time information or usage place information, is consistent with the usage time information and the usage place information in one group of user's usage habit information that is obtained when the user used the task corresponding to the certain task type A after machine learning, then the task corresponding to the current task type A can be automatically generated or adjusted according to other behaviors in the group of user's usage habit information, such as usage scope, usage frequency, and so on, thereby achieving the purpose of optimizing the corresponding task when the user uses the task type A in real time.

Further, after the step of "based on the at least one piece of usage habit information corresponding to each task type, the usage probability thereof and the real-time usage information, the task corresponding to the task type used by the user in real time is optimized", step S14 further includes:

informing the user of the optimized task corresponding to the task type used by the user in real time by a message reminder so that the user can choose to optimize the task corresponding to the task type used in real time based on the message reminder, thereby reducing the cost of time and resources when the user uses the task corresponding to the task type in the mobile robot in real time. Specifically, the method of the message reminder may include, but is not limited to, a short message prompt, a window popup message prompt, and a message prompt by giving an option to be selected and the like.

The task optimization method in a mobile robot according to an embodiment of the present invention further includes:

based on the obtained usage status information when the user uses the task corresponding to the task type in the mobile robot in real time, the usage probability of the user's usage habit information corresponding to the task type is updated. The usage status information may include, but is not limited to, a pausing use status, a terminating use status during use, a canceling use status, and a whole-course use status of selecting an executing task, and the like. For example, if the user does not perform a pausing or a canceling or a terminating after using or other operations for the use status on the task corresponding to the task type of the current mobile robot, then the usage probability of user's usage habit information corresponding to the task type used in real time can be increased and updated; otherwise the usage probability of user's usage habit information corresponding to the task type used in real time is decreased and updated accordingly, which makes the usage probability of the user's usage habit information corresponding to each task type more accurate.

Figure 2:
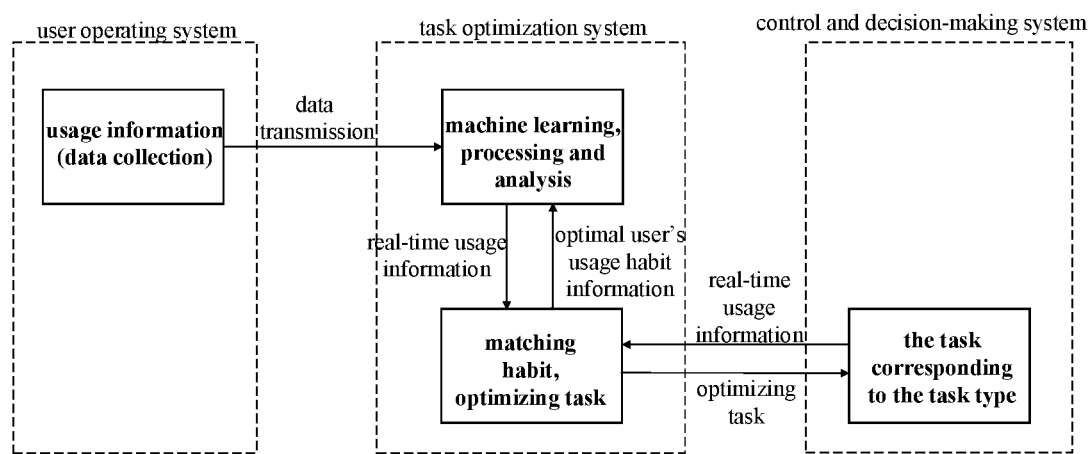
FIG. 2 shows a schematic diagram of a practical application scenario of a task optimization method in a mobile robot according to one aspect of the present invention.

FIG. 2 is a schematic diagram of a practical application scenario of the task optimization method in a mobile robot according to the first aspect of the present invention. The application scenario includes a user operating system, a task optimization system and a control and decision-making system. Specifically, for each task type in a mobile robot, the user operating system collects usage information (data collection) of all users who have used the task corresponding to the task type, and then transmits the collected usage information of all users who have used the task corresponding to each task type to the task optimization system in the form of data transmission.

According to the above steps S11 to S14 of the task optimization method provided in the present invention, the task optimization system will perform machine learning, processing and analysis on the obtained usage information through the machine learning model, and obtain at least one piece of user's usage habit information corresponding to each task type and usage probability thereof. When a user uses a task corresponding to a certain task type in a mobile robot in real time, the control and decision-making system sends the user's real-time usage information to the task optimization system, so that the task optimization system obtains the user's real-time usage information.

Based on the user's real-time usage information, habit matching is performed on at least one piece of user's usage habit information corresponding to each task type and usage probability thereof to obtain the user's usage habit information with the best matching degree to the real-time usage information. Based on the user's usage habit information with the best matching degree to the real-time usage information, the task corresponding to the task type used by the user in real time is optimized. Then, the optimized task corresponding to the task type used by the user in real time is transmitted to the mobile robot, and the user is notified by a message reminder, so that the user can choose to optimize the task corresponding to the task type used in real time based on the message reminder, thereby reducing the cost of time and resources when the user uses the task corresponding to the task type in the mobile robot in real time. Specifically, the method of the message reminder may include, but is not limited to, a short message prompt, a window popup message prompt, and a message prompt by giving an option to be selected, and the like.

Figure 3:
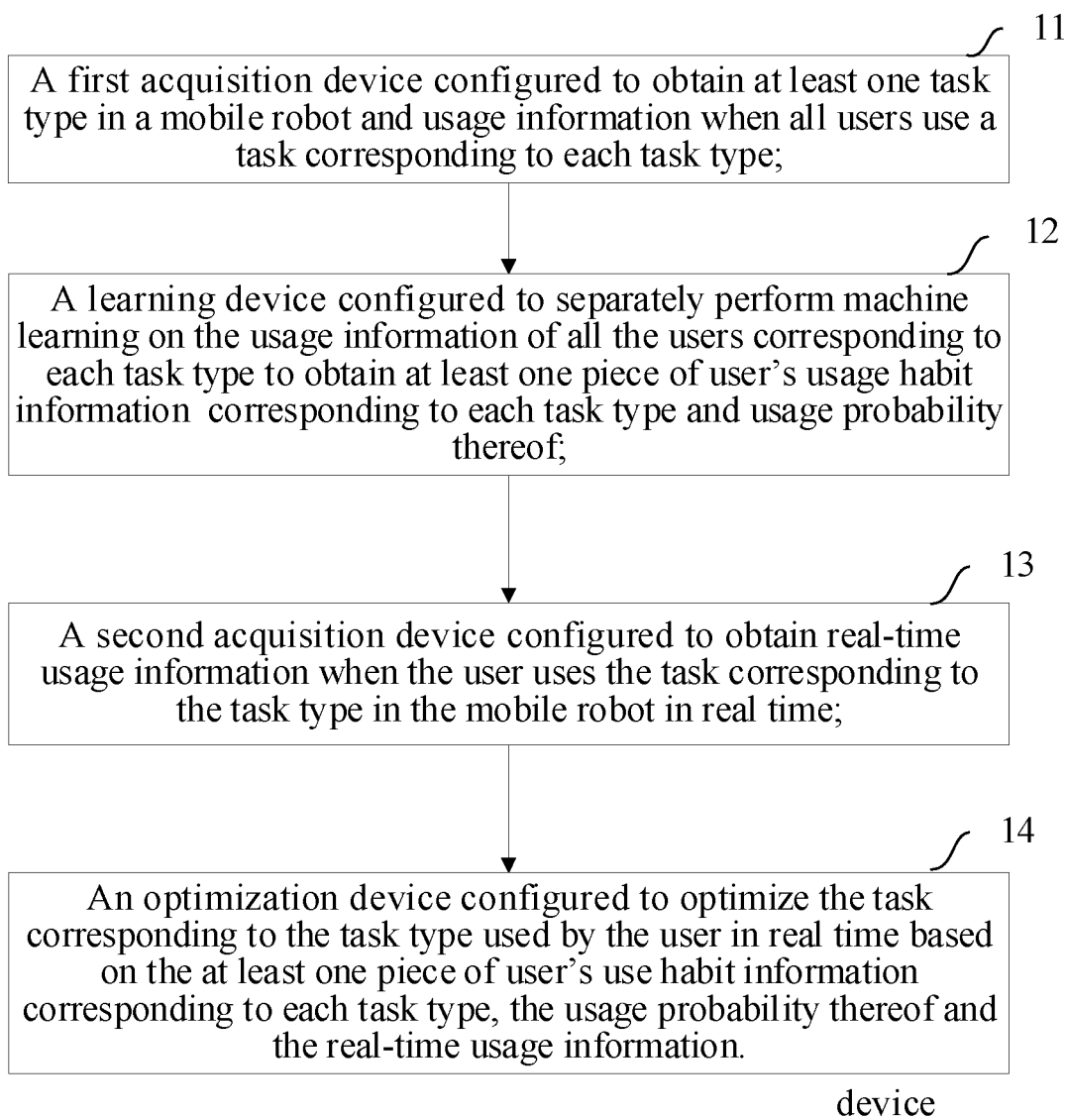
FIG. 3 shows a module diagram of a task optimization device in a mobile robot according to another aspect of the invention.

FIG. 3 shows a module diagram of a task optimization device in a mobile robot according to a second aspect of the present invention, when a user uses a task in a mobile robot in real time, in the process of optimizing the task corresponding to the task type to be performed by the mobile robot, the task optimization device includes the first acquisition device 11, the learning device 12, the second acquisition device 13 and the optimization device 14, as follows.

The first acquisition device 11 is configured to obtain at least one task type in a mobile robot and usage information when all users use a task corresponding to each task type. The learning device 12 is configured to separately perform machine learning on the usage information of all the users corresponding to each task type to obtain at least one piece of user's usage habit information corresponding to each task type and usage probability thereof. For each task type in the mobile robot, the machine learning is performed on usage information when all users use a task corresponding to a task type to automatically generate at least one piece of user's usage habit information corresponding to each task type and usage probability thereof, so that when a user subsequently uses the task corresponding to the task type in the mobile robot in real time, the task is optimized. Subsequently, when a user uses a task corresponding to a task type in the mobile robot in real time, the second acquisition device 13 is configured to obtain real-time usage information when the user uses the task corresponding to the task type in the mobile robot in real time. Then, the optimization device 14 is configured to optimize the task corresponding to the task type used by the user in real time based on the at least one piece of usage habit information corresponding to each task type, the usage probability thereof and the real-time usage information, which can help the mobile robot to complete execution of the task corresponding to the corresponding task type more efficiently and intelligently, and can reduce the time and resources spent when the user uses the task corresponding to the task type in the mobile robot in real time.

Here, the usage information obtained in the first acquisition device 11 when all users use a task corresponding to each task type may include, but is not limited to, one or more items of the usage time, the usage place, the usage scope and the usage counter. Specifically, the usage time may include the usage start time, the usage end time, the usage duration and so on. Of course, those skilled in the art shall understand that any other existing usage information or any other prospective usage information, which is applicable to the present invention, shall fall within the protective scope of the present invention and shall be included herein by reference.

Of course, in the present invention, the at least one piece of user's usage habit information corresponding to each task type obtained in the learning device 12 by separately performing machine learning on the usage information of all the users corresponding to each task type may include, but is not limited to, one or more items of the usage time, the usage place, the usage scope and the usage counter. Specifically, the usage time may include the usage start time, the usage end time, the usage duration and so on. Of course, those skilled in the art shall understand that any other existing usage habit information or any other prospective usage habit information, which is applicable to the present invention, shall fall within the protective scope of the present invention and shall be included herein by reference.

Further, the learning device 12 is configured to separately perform machine learning on the usage information of all the users corresponding to each task type to obtain at least one piece of user's usage habit information corresponding to each task type and usage probability thereof based on a preset machine learning model. Herein, different preset machine learning models are determined according to different application scenarios of the mobile robot, wherein the different machine learning models correspond to different machine learning algorithms.

In an embodiment of the present invention, at least one task type in a mobile robot in the first acquisition device 11 and usage information when all users use a task corresponding to each task type are shown in Table-2. For different task types, the number of usage information corresponding to each task type is at least one. Among different usage information corresponding to the same task type, a corresponding preset machine learning model can be adopted to learn and obtain at least one piece of usage habit information corresponding to the task type and the usage probability thereof. For example, for task type A, and if the task type A corresponds to six groups of usage habit information and usage probability, including: usage habit information M1 and usage probability p1, usage habit information M2 and usage probability p2, usage habit information M3 and usage probability p3, usage habit information M4 and usage probability p4, usage habit information M5 and usage probability p5, and usage habit information M6 and usage probability p6. In this way, machine learning can be performed on usage information of all users corresponding to each task type in the mobile robot, so as to optimize the task when a user subsequently uses the task corresponding to the task type in the mobile robot in real time.

TABLE 2

| | Usage habit information corresponding to each task type and usage probability thereof in a mobile robot | | | | | |
|---|---|---|---|---|---|---|
| | Usage time | Usage place | Usage range | Usage count | ... Usage habit ... information | Usage probability |
| Task type A | T1 | PL1 | S1 | U1 | M1 | p1 |
| Task type A | T2 | PL 2 | S2 | U2 | M2 | p2 |
| ... | Tm | PL m | Sm | Um | Mm | pm |
| Task type B | T(m + 1) | PL(m + 1) | S(m +1) | U(m + 1) | M(m + 1) | p(m + 1) |
| Task type B | T(m + 2) | PL(m + 2) | S(m + 2) | U(m + 2) | M(m + 2) | p(m + 2) |
| ... | T(m + n) | PL(m + n) | S(m + n) | U(m + n) | M(m + n) | p(m + n) |

In an embodiment of the present invention, the optimization device 14 is configured to:

based on at least one piece of usage habit information corresponding to each task type and usage probability thereof, analyze and match real-time usage information to obtain user's usage habit information matched with the real-time usage information; based on the user's usage habit information matched with the real-time usage information, optimize the task corresponding to the task type used by the user in real time, so as to optimize the task corresponding to the task type when the user uses the mobile robot in real time, which can help the mobile robot to complete execution of the task corresponding to the corresponding task type more efficiently and intelligently, thereby reducing the cost of time and resources when the user uses the task corresponding to the task type in the mobile robot in real time.

In an exemplary embodiment, the optimization device 14 is configured to obtain at least one piece of usage habit information corresponding to the task type used by the user in real time and the usage probability thereof from at least one piece of usage habit information corresponding to each task type and usage probability thereof based on a task type used by a user in real time. For example, if a user uses a mobile robot in real time to obtain the task type used by the user in real time is ed, such as the task type A, then at least one piece of usage habit information corresponding to the task type and the usage probability thereof A used by the user in real time are obtained from at least one piece of usage habit information corresponding to each task type and usage probability thereof in Table-2. If the task type A corresponds to six groups of usage habit information and usage probability, then they are respectively: usage habit information M1 and usage probability p1, usage habit information M2 and usage probability p2, usage habit information M3 and usage probability p3, usage habit information M4 and usage probability p4, usage habit information M5 and usage probability p5, and usage habit information M6 and usage probability p6;

The optimization device 14 is further configured separately to calculate a similarity between a real-time usage information and each usage habit information corresponding to the task type used by the user in real time. For example, the similarities between the real-time usage information and the usage habit information M1, between the real-time usage information and the usage habit information M2, between the real-time usage information and the usage habit information M3, between the real-time usage information and the usage habit information M4, between the real-time usage information and the usage habit information M5, and between the real-time usage information and the usage habit information M6 are calculated, respectively, so as to correspondingly obtain the similarity 1, the similarity 2, the similarity 3, the similarity 4, the similarity 5 and the similarity 6, respectively. The similarities are arranged in ascending order as follows: similarity 3, similarity 1, similarity 4, similarity 6, similarity 5, and similarity 2.

The optimization device 14 is further configured to obtain user's usage habit information matched with the real-time usage information based on the similarity and the usage probability. For example, if the usage probabilities respectively corresponding to the usage habit information M1, the usage habit information M2, the usage habit information M3, the usage habit information M4, the usage habit information M5, and the usage habit information M6 are arranged in descending order, as follows: usage probability p3, usage probability p4, usage probability p1, usage probability p6, usage probability p2, and usage probability p5. According to the similarity between the real-time usage information and each usage habit information corresponding to the task type used by the user in real time, and the usage probability of each usage habit information, it can be obtained that the usage habit information matched with the real-time usage information should be the usage habit information M3, thereby realizing the matching of the usage habit information corresponding to the real-time usage information.

In an embodiment of the present invention, if the similarities between the real-time usage information and the usage habit information M1, between the real-time usage information and the usage habit information M2, between the real-time usage information and the usage habit information M3, between the real-time usage information and the usage habit information M4, between the real-time usage information and the usage habit information M5, and between the real-time usage information and the usage habit information M6, which are obtained in the optimization device 14, are arranged in ascending order as follows: similarity 3 and similarity 1, similarity 4, similarity 6, similarity 5, and similarity 2, wherein, similarity 3 is the same as similarity 1, so similarity 3 and similarity 1 tie for first place. Furthermore, if the usage probabilities respectively corresponding to the usage habit information M1, the usage habit information M2, the usage habit information M3, the usage habit information M4, the usage habit information M5, and the usage habit information M6 are arranged in descending order as follows: usage probability p3, usage probability p4, usage probability p1, usage probability p6, usage probability p2, and usage probability p5, since the similarity between the real-time usage information and the usage habit information M3 is the highest, and the usage probability p3 of the usage habit information M3 is greater than the usage probability p1 of the usage habit information M1, the optimization device 14 can figure out that the usage habit information matched with the real-time usage information should be the usage habit information M3, thereby realizing the matching of the usage habit information corresponding to the real-time usage information.

In an embodiment of the invention, when a user uses a task corresponding to a certain task type A among tasks corresponding to at least one task type in a mobile robot in real time, if the current real-time usage information used by the user, such as usage time information or usage place information, is consistent with the usage time information and the usage place information in one group of user's usage habit information that is obtained when the user used the task corresponding to the certain task type A after machine learning, then the task corresponding to the current task type A can be automatically generated or adjusted according to other behaviors in the group of user's usage habit information, such as usage scope, usage frequency, and so on, thereby achieving the purpose of optimizing the corresponding task when the user uses the task type A in real time.

Further, the optimization device 14 is further configured to inform the user of the optimized task corresponding to the task type used by the user in real time by a message reminder, so that the user can choose to optimize the task corresponding to the task type used in real time based on the message reminder, thereby reducing the cost of time and resources when the user uses the task corresponding to the task type in the mobile robot in real time. Specifically, the method of the message reminder may include, but is not limited to, a short message prompt, a window popup message prompt, and a message prompt by giving an option to be selected, and the like.

The task optimization device in the mobile robot according to an embodiment of the present invention, the device further includes an update device, wherein the update device is configured to update the usage probability of the user's usage habit information corresponding to the task type based on the obtained usage status information when the user uses the task corresponding to the task type in the mobile robot in real time. The usage status information may include, but is not limited to, a pausing use status, a terminating use status during use, a canceling use status, and a whole-course use status of selecting an executing task, and the like. For example, if the user does not perform a pausing or a canceling or a terminating after using or other operations for the use status on the task corresponding to the task type of the current mobile robot, then the usage probability of user's usage habit information corresponding to the task type used in real time can be increased and updated; otherwise, the usage probability of user's usage habit information corresponding to the task type used in real time is decreased and updated accordingly, which makes the usage probability of the user's usage habit information corresponding to each task type more accurate.

In conclusion, in the present invention, at least one task type in a mobile robot and usage information when all users use a task corresponding to each task type is obtained; machine learning is separately performed on the usage information of all the users corresponding to each task type to obtain at least one piece of user's usage habit information corresponding to each task type and usage probability thereof. For each task type in the mobile robot, the machine learning is performed on usage information when all users use the task corresponding to the task type, and at least one piece of user's usage habit information corresponding to each task type and the usage probability thereof are automatically generated which facilitates subsequently obtaining real-time usage information when the user uses the task corresponding to the task type in the mobile robot in real time. based on the at least one piece of usage habit information corresponding to each task type, the usage probability thereof and the real-time usage information, the task corresponding to the task type used by the user in real time is optimized. In this way, the mobile robot with the aid of the method can more efficiently and intelligently complete execution of the task corresponding to the corresponding task type, and the time and resources spent by the user on using the task corresponding to the task type in the mobile robot in real time can be reduced.

According to the third aspect of the present invention, a computing device is provided, including:

a processor;

a memory configured to store a computer executable instruction, wherein, the computer executable instruction enables the processor to execute the following steps:

obtaining at least one task type in a mobile robot and usage information when all users use a task corresponding to each task type;

separately performing machine learning on the usage information of all the users corresponding to each task type to obtain at least one piece of user's usage habit information corresponding to each task type and usage probability thereof;

obtaining real-time usage information when the user uses the task corresponding to the task type in the mobile robot in real time; and based on the at least one piece of usage habit information corresponding to each task type, the usage probability thereof and the real-time usage information, optimizing the task corresponding to the task type used by the user in real time.

According to a fourth aspect of the present invention, a computer readable storage medium is provided, wherein, the computer readable storage medium stores a computer executable instruction, and the computer executable instruction enables the processor to execute the following steps:

obtaining at least one task type in a mobile robot and usage information when all users use a task corresponding to each task type;

separately performing machine learning on the usage information of all the users corresponding to each task type to obtain at least one piece of user's usage habit information corresponding to each task type and usage probability thereof;

obtaining real-time usage information when the user uses the task corresponding to the task type in the mobile robot in real time; and based on the at least one piece of usage habit information corresponding to each task type, the usage probability thereof and the real-time usage information, optimizing the task corresponding to the task type used by the user in real time.

It should be noted that the present invention may be implemented in software and/or a combination of software and hardware, for example, may be implemented by using an application specific integrated circuit (ASIC), a general-purpose computer, or any other similar hardware device. In an embodiment, the software program in the present invention may be executed by a processor to implement the steps or functions described above. Similarly, the software program (including related data structures) in the present invention may be stored in a computer-readable recording medium such as a RAM memory, a magnetic drive, an optical drive or a floppy disk, and the like. In addition, some of the steps or functions of the present invention may be implemented in hardware, such as, a circuit that cooperates with the processor to perform the steps or functions, including micro-electro-mechanical systems.

In addition, a part of the present invention may be applied to a computer program product, such as a computer program instruction. The computer program instruction, when executed by a computer, may invoke or provide a method and/or technical solution according to the present invention by operations of the computer. Furthermore, the program instruction invoking the method of the present invention may be stored in a fixed or removable recording medium and/or transmitted by a data stream in a broadcast or other media carrying signals, and/or stored in a working memory of a computer device running according to the program instruction. Herein, a device in an embodiment of the present invention includes a memory for storing computer program instructions and a processor for executing the computer program instructions, wherein, when, the computer program instructions are executed by the processor, and the device is driven to perform the aforementioned methods and/or technical solutions of a plurality of the embodiments of the present invention.

It is apparent to those skilled in the art that the present invention is not limited to details of the above exemplary embodiments, and the present invention may be implemented in other implementations without departing from the spirit or basic features of the present invention. Therefore, the embodiments should be considered as exemplary and non-limiting from any point of view. The scope of the present invention is defined by the appended claims rather than the above descriptions. Therefore, all changes that fall within the meaning and scope of equivalents of the claims are included in the present invention. Any reference signs in the claims should not be construed as limiting the claims.

In addition, it is apparent that the word "include" does not exclude other elements or steps, and the singular does not exclude the plural.

The plurality of units or devices stated in the claims of the device may also be implemented by a unit or device through software or hardware.

The words such as "first", "second", and the like are used to denote names and do not denote any particular order.

What is claimed is:

1. A task optimization method in a mobile robot, comprising:
    S11: obtaining at least one task type in the mobile robot and usage information when all users use the mobile robot to perform a task corresponding to each task type;
    S12: separately performing machine learning on the usage information of all the users corresponding to each task type to obtain at least one piece of user's usage habit information corresponding to each task type and a usage probability of each user's usage habit information corresponding to each task type;
    S13: obtaining real-time usage information when a user uses the mobile robot to perform the task corresponding to a task type in the mobile robot in real time; and
    S14: based on the at least one piece of user's usage habit information corresponding to each task type, the usage probability of each user's usage habit information corresponding to each task type and the real-time usage information, optimizing the task corresponding to the task type used by the user in real time.

2. The method according to claim 1, wherein the step S14 comprises:
    S141: based on the at least one piece of user's usage habit information corresponding to each task type and the usage probability of each user's usage habit information corresponding to each task type, analyzing and matching the real-time usage information to obtain user's usage habit information matched with the real-time usage information; and
    S142: based on the user's usage habit information matched with the real-time usage information, optimizing the task corresponding to the task type used by the user in real time.

3. The method according to claim 2, wherein the step S141 comprises:
    based on the task type used by the user in real time, obtaining at least one piece of user's usage habit information corresponding to the task type used by the user in real time and the usage probability of each user's usage habit information corresponding to the task type used by the user in real time from the at least one piece of user's usage habit information corresponding to each task type and the usage probability of each user's usage habit information corresponding to each task type;
    separately calculating a similarity between the real-time usage information and each user's usage habit information corresponding to the task type used by the user in real time; and
    based on the similarity and the usage probability of each user's usage habit information corresponding to the task type used by the user in real time, obtaining the user's usage habit information matched with the real-time usage information.

4. The method according to claim 1, wherein the step S12 comprises:
    based on a preset machine learning model, separately performing machine learning on the usage information of all the users corresponding to each task type to obtain the at least one piece of user's usage habit information corresponding to each task type and the usage probability of each user's usage habit information corresponding to each task type.

5. The method according to claim 1, wherein after the step S14, the method further comprises:
    informing the user of an optimized task corresponding to the task type used by the user in real time by a message reminder.

6. The method according to claim 1, further comprising:
    based on usage status information obtained when the user uses the task corresponding to the task type in the mobile robot in real time, updating the usage probability of each user's usage habit information corresponding to the task type.

7. The method according to claim 1, wherein the at least one piece of user's usage habit information is usage time, usage place, usage scope, or usage counter.

8. A task optimization device in a mobile robot, comprising:
    a first acquisition device, wherein the first acquisition device is configured to obtain at least one task type in a mobile robot and usage information when all users use the mobile robot to perform a task corresponding to each task type;
    a learning device, wherein the learning device is configured to separately perform machine learning on the usage information of all the users corresponding to each task type to obtain at least one piece of user's usage habit information corresponding to each task type and a usage probability of each user's usage habit information corresponding to each task type;
    a second acquisition device, wherein the second acquisition device is configured to obtain real-time usage information when the user uses the mobile robot to perform the task corresponding to a task type in the mobile robot in real time; and
    an optimization device, wherein the optimization device is configured to optimize the task corresponding to the task type used by the user in real time based on the at least one piece of user's usage habit information corresponding to each task type, the usage probability of each user's usage habit information corresponding to each task type and the real-time usage information;
    wherein the first acquisition device, the learning device, the second acquisition device, and the optimization device each includes a processor and a memory storing computer program instructions configured to be executed by the processor.

9. The device according to claim 8, wherein the optimization device is configured to:
    based on the at least one piece of user's usage habit information corresponding to each task type and the usage probability of each user's usage habit information corresponding to each task type, analyze and match the real-time usage information to obtain user's usage habit information matched with the real-time usage information; and
    based on the user's usage habit information matched with the real-time usage information, optimize the task corresponding to the task type used by the user in real time.

10. The device according to claim 9, wherein the optimization device is configured to:
    based on the task type used by the user in real time, obtain at least one piece of user's usage habit information corresponding to the task type used by the user in real time and the usage probability of each user's usage habit information corresponding to the task type used by the user in real time from the at least one piece of user's usage habit information corresponding to each task type and the usage probability of each user's usage habit information corresponding to each task type;
    separately calculate a similarity between the real-time usage information and each user's usage habit information corresponding to the task type used by the user in real time; and
    based on the similarity and the usage probability of each user's usage habit information corresponding to the task type used by the user in real time, obtain the user's usage habit information matched with the real-time usage information.

11. The device according to claim 8, wherein the learning device is configured to:
    based on a preset machine learning model, separately perform machine learning on the usage information of all the users corresponding to each task type to obtain the at least one piece of user's usage habit information corresponding to each task type and the usage probability of each user's usage habit information corresponding to each task type.

12. The device according to claim 8, wherein the optimization device is configured to inform the user of an optimized task corresponding to the task type used by the user in real time by a message reminder.

13. The device according to claim 8, further comprising an update device, wherein:
    based on usage status information obtained when the user uses the task corresponding to the task type in the mobile robot in real time, the update device is configured to update the usage probability of each user's usage habit information corresponding to the task type; and
    the update device includes a processor and a memory storing computer program instructions configured to be executed by the processor.

14. The device according to claim 8, wherein the at least one piece of user's usage habit information is usage time, usage place, usage scope, or usage counter.

15. A computing device, comprising:
    a processor;
    a memory configured to store a computer executable instruction, the computer executable instruction enables the processor to execute the following steps:
    S11: obtaining at least one task type in a mobile robot and usage information when all users use the mobile robot to perform a task corresponding to each task type;
    S12: separately performing machine learning on the usage information of all the users corresponding to each task type to obtain at least one piece of user's usage habit information corresponding to each task type and a usage probability of each user's usage habit information corresponding to each task type;
    S13: obtaining real-time usage information when a user uses the mobile robot to perform the task corresponding to a task type in the mobile robot in real time; and
    S14: based on the at least one piece of user's usage habit information corresponding to each task type, the usage probability of each user's usage habit information corresponding to each task type and the real-time usage information, optimizing the task corresponding to the task type used by the user in real time.

16. The method according to claim 2, wherein the at least one piece of user's usage habit information is usage time, usage place, usage scope, or usage counter.

17. The method according to claim 3, wherein the at least one piece of user's usage habit information is usage time, usage place, usage scope, or usage counter.

18. The method according to claim 4, wherein the at least one piece of user's usage habit information is usage time, usage place, usage scope, or usage counter.

19. The method according to claim 5, wherein the at least one piece of user's usage habit information is usage time, usage place, usage scope, or usage counter.

* * * * *